United States Patent

Rice

(10) Patent No.: US 9,267,533 B2
(45) Date of Patent: Feb. 23, 2016

(54) LOCKING FASTENER

(75) Inventor: Edward Claude Rice, Indianpaolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1169 days.

(21) Appl. No.: 12/521,961

(22) PCT Filed: Dec. 18, 2008

(86) PCT No.: PCT/US2008/013936
§ 371 (c)(1),
(2), (4) Date: Jul. 1, 2009

(87) PCT Pub. No.: WO2009/079018
PCT Pub. Date: Jun. 25, 2009

(65) Prior Publication Data

US 2010/0040429 A1    Feb. 18, 2010

Related U.S. Application Data

(60) Provisional application No. 61/008,061, filed on Dec. 18, 2007.

(51) Int. Cl.
*F16B 39/06* (2006.01)
*F16B 39/36* (2006.01)
*F16B 35/04* (2006.01)

(52) U.S. Cl.
CPC .............. *F16B 39/36* (2013.01); *F16B 35/045* (2013.01)

(58) Field of Classification Search
CPC .............................. F16B 39/36; F16B 35/045
USPC ................... 411/325, 140, 265, 268, 271
See application file for complete search history.

(56) References Cited

U.S. PATENT DOCUMENTS

| | | | | |
|---|---|---|---|---|
| 1,066,414 A | * | 7/1913 | Gendre | 251/361 |
| 2,720,392 A | * | 10/1955 | Cartlidge | 299/103 |
| 3,352,343 A | * | 11/1967 | Stitt | 411/271 |
| 4,252,167 A | * | 2/1981 | Dessouroux | 411/263 |
| 4,403,894 A | | 9/1983 | Clark | |
| 4,436,117 A | | 3/1984 | Martin | |
| 4,982,763 A | | 1/1991 | Klahn | |
| 5,333,976 A | | 8/1994 | Dobbrunz | |
| 6,056,490 A | | 5/2000 | Dillemuth et al. | |
| 7,165,924 B1 | * | 1/2007 | Breslin et al. | 411/271 |
| 2002/0094240 A1 | | 7/2002 | Cook | |
| 2007/0201965 A1 | | 8/2007 | Littlewood | |

FOREIGN PATENT DOCUMENTS

WO    WO 2009/079018    6/2009

OTHER PUBLICATIONS

Supplementary European Search Report, EP 08 86 1775, Rolls-Royce Corporation, May 25, 2012.

* cited by examiner

*Primary Examiner* — Gary Estremsky
(74) *Attorney, Agent, or Firm* — Barnes & Thornburg LLP

(57) ABSTRACT

The present disclosure provides a multiple use threaded fastener having a plurality of redundant locking features. The fastener includes a threaded hollow lock bolt having a tapered internal wall constructed to threadingly engage a threaded aperture in a housing. A threaded lock stud having a tapered external wall is constructed to fit at least partially within the hollow lock bolt and threadingly engage the threaded aperture of the housing and engage the tapered wall of the hollow lock bolt.

4 Claims, 4 Drawing Sheets

LOCKING FASTENER

CROSS REFERENCE TO RELATED APPLICATIONS

The present application is a 35 USC §371 National Stage filing of PCT/US2008/013936 filed on Dec. 18, 2008, which claims the benefit of U.S. Provisional Patent Application No. 61/008,061 filed Dec. 18, 2007, each of which is incorporated herein by reference.

FIELD OF THE INVENTION

The present invention relates to a re-useable threaded fastener having redundant locking features.

BACKGROUND

Ideally threaded fasteners should not disengage unless and until they are intentionally removed by human intervention. Unfortunately it is known that common fasteners sometimes loosen over time due to external environmental factors such as temperature cycling, high vibration, and the like. The primary method of locking a threaded fastener is by torquing a fastener having external male thread into a component having matching female thread to a predetermined level. Torquing the fastener causes a threaded shank to load in tension which in turn causes the male and female treads to tightly engage at their interface and become fixed with respect to one another due to friction between the contact faces of the thread.

Torquing the fastener to a predetermined level works well as long as there have been no mistakes in the assumed operational conditions. If the vibratory loads, thermal expansion or even the calibration of the torque wrench is different than the assumed criteria, then the fastener can loosen over time. In critical applications that involve safety such as in the aerospace industry or with high value components a redundant locking feature is necessary to ensure the integrity of the fastened joint. Various locking features have been employed over the years, but they all have one or more drawbacks in which the present invention overcomes. The use of lockwire is one example of a redundant locking feature. If implemented properly lockwire is almost 100% effective in preventing a fastener from inadvertently loosening. However, installing lockwire is extremely time consuming, tedious and if not done properly will be ineffective. Lockwire can also become cost prohibitive due to the labor intensive nature of the method.

Another common redundant locking method utilizes deformed inserts. The deformation typically includes ovalizing a portion of the insert which causes a relatively large friction load that inhibits the fastener from rotating under normal external forces. However, there are also drawbacks with locking inserts. One problem with locking inserts is that repeated use can cause the inserts to wear or yield to the point that the insert is no longer effective at locking the fastener. Another problem is that locking inserts are difficult to install properly in the first place and are even more difficult to remove and replace. The present invention addresses the problems associated with prior art fasteners by providing a novel and non-obvious solution for a reusable threaded fastener having redundant locking features,

SUMMARY

The present invention includes a multiple use threaded fastener having a plurality of redundant locking features. The fastener includes a threaded hollow lock bolt having a tapered internal wall constructed to threadingly engage a threaded aperture in a housing. A threaded lock stud having a tapered external wall is constructed to fit at least partially within the hollow lock bolt and threadingly engage the threaded aperture of the housing and engage the tapered wall of the hollow lock bolt. Further embodiments, forms, features, aspects, benefits, and advantages shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
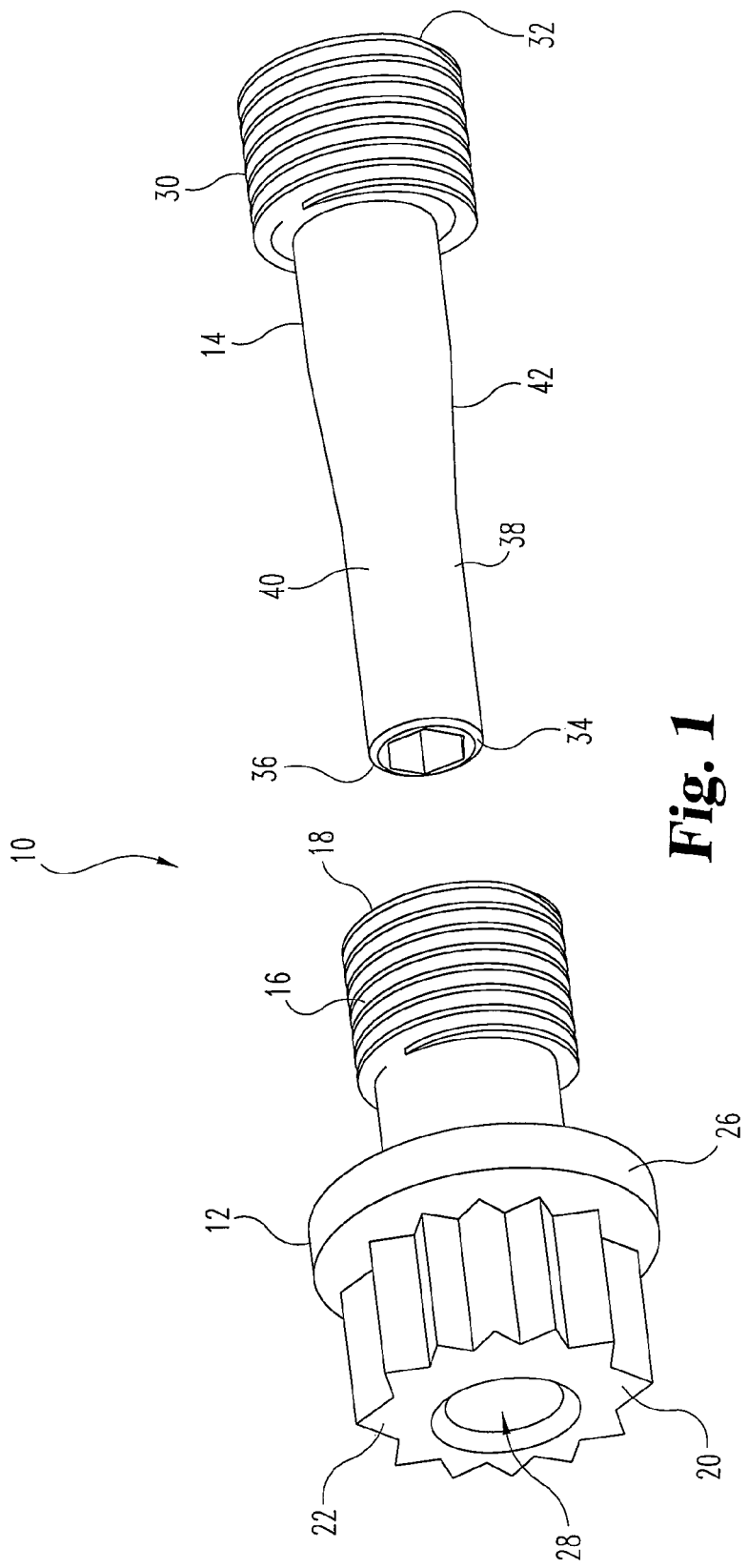
FIG. 1 is a perspective view of a locking fastener according to one embodiment of the present invention.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present inventions relate to a fastener that has multiple redundant locking features associated therewith. The locking fastener is particularly useful for applications that include blind tapped apertures. The locking fastener is designed to permit repeated uses without damaging the threads of either the fastener or the fastened component. The locking fastener disclosed herein is particularly useful for high-value machines and those machines requiring a greater safety factor in keeping the fastened joints connected.

Referring to FIG. 1, a locking fastener 10 according to one form of the present invention is illustrated therein. The locking fastener 10 includes a hollow lock bolt 12 and a lock stud 14. The hollow lock bolt 12 includes threads 16 formed on one end 18 and a drive head 20 formed on the opposing end 22. The threads 16 can be of any standard ANSI (American National Standards Institute) or nonstandard design if desirable. The head 20 can be a 12 point socket head, as shown in the illustrated embodiment, or alternatively the head 20 can be designed to accept any standard or nonstandard tool such as a wrench or socket for torquing the bolt 12 into position. The bolt 12 may have a flange 26 as is the case with a standard flange head design or alternatively may be used with a separate washer (not shown) if desired. The lock bolt 12 further includes an internal through opening 28 that extends through the longitudinal length of the bolt 12.

The lock stud 14 includes external threads 30 formed at one end 32 and a drive head 34 formed at the opposing end 36. As with the hollow lock bolt 12, the threads 30 of the lock stud 14 can be standard ANSI type thread or alternatively a nonstandard thread. However, the threads 30, 16 of the lock stud 14 and the lock bolt 12 can be identical so that each can threadingly engage into the same tapped aperture. The drive head 34 of the lock stud 14 can be of any standard or nonstandard type, however, the head must be able to extend through the internal diameter of the through opening 28 of the lock bolt 12. In one preferable form, the drive head 34 can be of an internal hex type. The lock stud 14 further includes a shank 38 having a relatively smooth outer wall 40 with an angled taper 42 located between the drive head 34 and the threads 30 at the opposing ends 32, 36, respectively.

Figure 2:
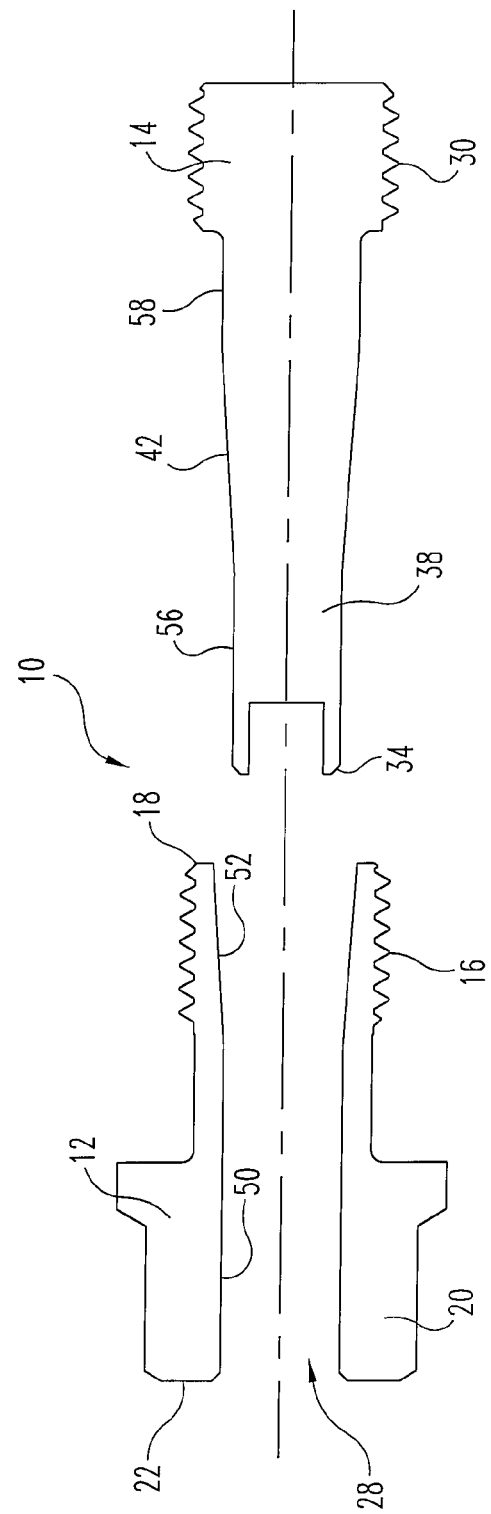
FIG. 2 is cross sectional view of the locking fastener of FIG. 1.

Referring to FIG. 2, the locking fastener 10 is shown in cross section. The through opening 28 in the hollow bolt 12 can be clearly seen. The through opening 28 can include a relatively straight internal diameter 50 at the second end 22 adjacent the head 20, but has an outwardly tapered or angled wall 52 extending toward the first end 18 adjacent to the threads 16. The shank 38 of the lock stud 14 has an outer wall 56 adjacent the head 34 with a smaller diameter than the internal diameter 50 of the through opening 28 in the lock bolt 12. The shank 38 of the lock stud 14 increases in diameter along the tapered or angled wall 42 until it reaches a maximum outer diameter 58 adjacent the threads 30 of the lock stud 14. The maximum outer diameter 58 is larger than the internal diameter 50 of the through opening 28 adjacent the head 20 of the lock bolt 12. This ensures that the outer tapered wall 42 of the shank 38 will contact the inner tapered wall 52 of the lock bolt 12 when the lock stud 14 is installed through the internal opening 28 of the hollow lock bolt 12.

The tapered wall 52 of the bolt 12 and the tapered wall 42 of the lock stud 14 can be similar in slope and length. In one embodiment, the tapered walls, 52, 42 of the bolt 12 and lock stud 14 are substantially identical. In another embodiment the tapered walls are identical. In other embodiments, the tapered walls 52, 42 can be different from one other. In one preferred embodiment, the tapered walls 52, 42 have approximately four degrees of slope because it has been found that a four degree angle has the characteristics that not only allow the bolt 12 and the lock stud 14 to slidingly engage with one another, but also create such a tight friction fit that it functions as one of the locking features used to keep the fastener 10 locked into place after the appropriate torque has been applied.

Figure 3:
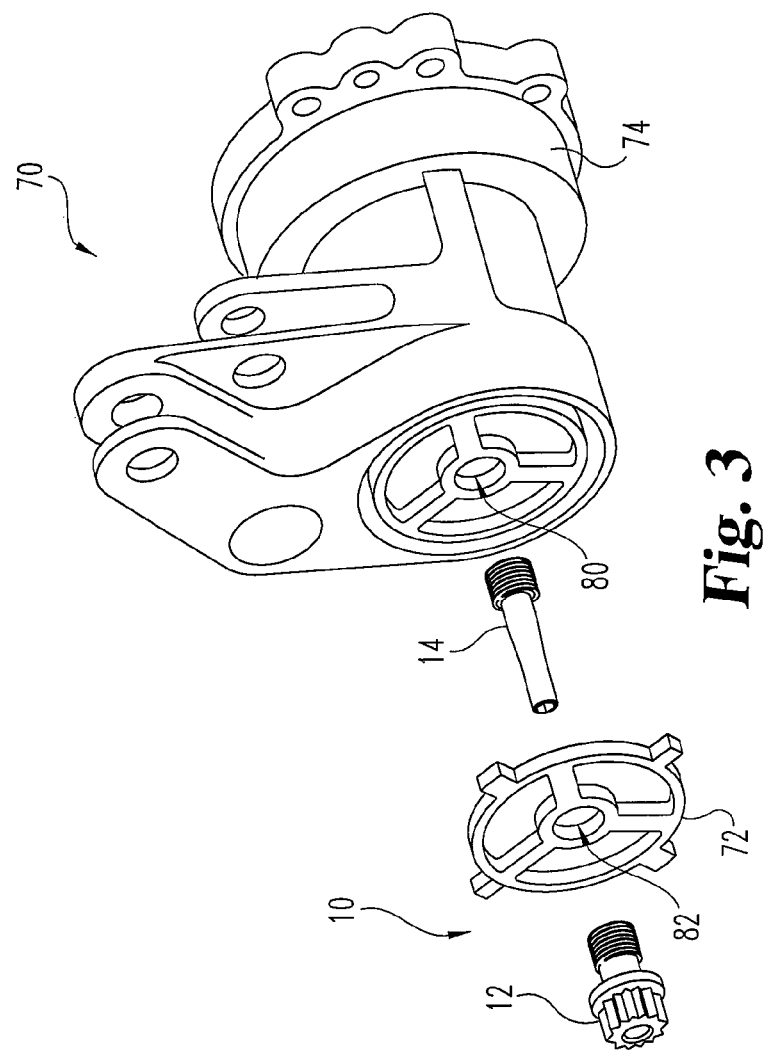
FIG. 3 is an exploded view of an exemplary apparatus utilizing the locking fastener of FIG. 1.

Referring now to FIG. 3, an exploded view of an exemplary structure 70 in which a lobed ring 72 is connected to a housing 74 with the locking fastener 10 is shown therein. The housing 74 includes a threaded aperture 80 for the lock stud 14 and lock bolt 12 to threadingly engage therewith. The lobed ring 72 includes an internal opening 82 for the lock stud 14 and lock bolt 12 to slide through. It should be understood that the exemplary structure 70 is presented for illustrative purposes only and that the locking fastener 10 can be used with any type of component in which a first component is fastened to a second component with an internally threaded aperture.

Figure 4:
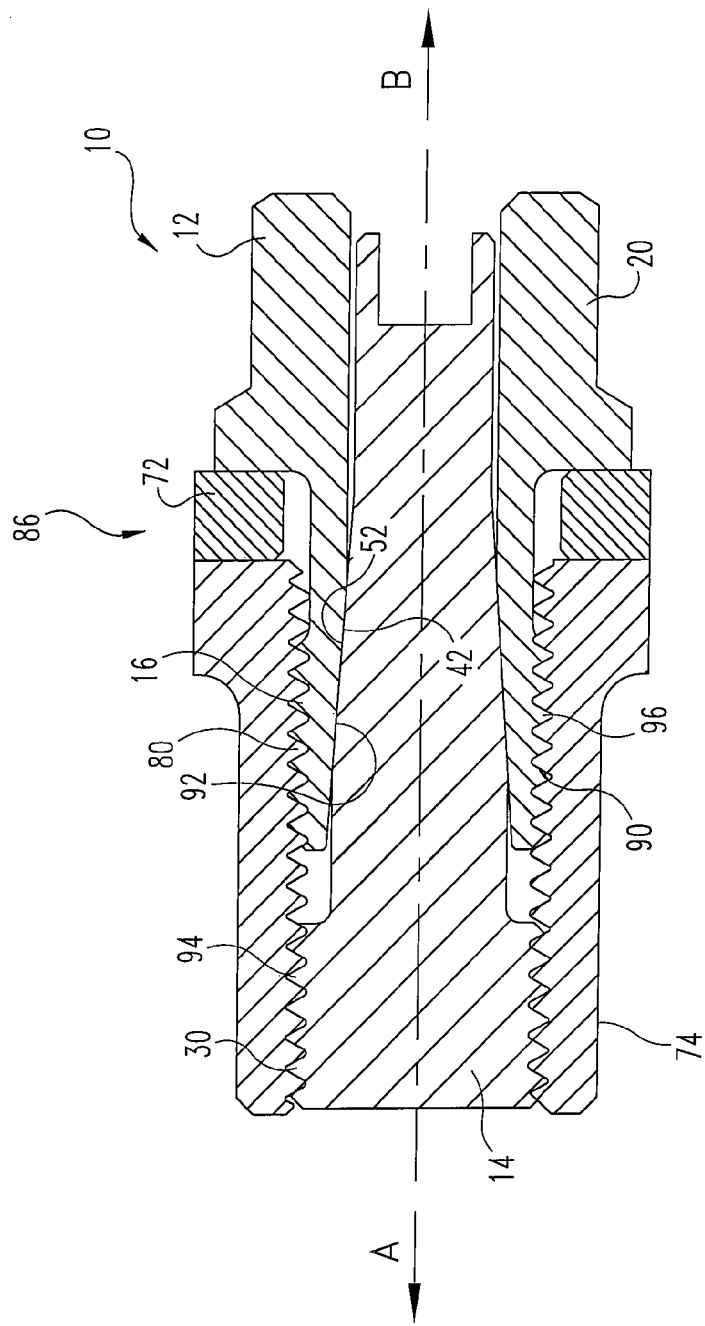
FIG. 4 is a cross-sectional view of the exemplary apparatus and locking fastener of FIG. 3 in a fastened position.

Referring now to FIG. 4, a joint 86 in which the lobed ring 72 is connected with the housing 74 via the locking faster 10 is shown in cross section. When the locking fastener 10 is installed as designed, the faster 10 has multiple redundant locking features. The first locking feature 90 is friction loading between the threads of the bolt 12 and the threads of the housing 74 caused by torquing the lock bolt 12 into the threaded aperture 80 of the housing 74. Torquing the bolt 12 causes the shank of the bolt 12 to load in tension or stretch in response to the rotation of the threads of the bolt 12 relative the threads of the housing 74. The simplified general equation that governs thread locking is $F=\mu*N$, where F is the turning force required to rotate the bolt, $\mu$ is the static friction coefficient of the thread material or material coating on the threads, and N is the normal force on the contact faces of the threads. The normal force is a function of the bolt stretch caused by torquing the bolt.

A second locking feature 92 is a taper lock defined by the loaded interface of the tapered walls 42, 52 of the locking stud 14 and lock bolt 12 respectively. A taper lock can be initiated between any two concentric walls having a taper angle that is reasonably matched to one another. A taper lock operates generally in the same manner as a press fit connection, wherein the inner wall places an outwardly acting radial hoop load on the outer wall and conversely the outer wall places an inwardly acting radial hoop load on the inner wall. In one form the taper angles can range between one and twenty degrees. In a preferred form the taper angles can range between two and six degrees. In an even more preferred form the taper angles can be substantially four degrees. While it is desirable that the tapered walls 42 and 52 have substantially similar taper angles it is also contemplated that the walls can have dissimilar taper angles. For example the tapered wall 42 of the lock stud 10 may have a taper angle that is a few degrees different (either larger or smaller) than the tapered wall 52 of the lock bolt 12. For purposes of this disclosure a mismatch in taper angles can include angles of up to ten degrees.

A third locking feature 94 is essentially a "jam nut" effect defined by the compression loading on the lock stud 14 between the threads 30 and the tapered wall 42. This "jam nut" effect is created by the reaction force of the tapered wall 52 of the lock bolt 12 acting against the tapered wall 42 of the lock stud 14 in first direction defined by arrow A when the lock stud 14 is torqued in the direction defined by arrow B. The threads 30 of the lock stud 14 are loaded against the threads of the housing 74 due to the reaction force of the interface of the tapered walls 42, 52. Similar to the primary locking feature, the friction force at the thread interface between the housing 74 and the lock stud 14 will prevent unintentional rotation of the lock stud 14.

A fourth locking feature 96 is defined by a radial hoop force generated by the interface loading of the tapered wall 42 of the lock stud 14 and the tapered wall 52 of the lock bolt 12. The radial hoop loading is transmitted into the thread interface between the lock bolt 12 and the housing 74. As the diameter of the hollow lock bolt 12 is expanded radially outward the threads 16 of the lock bolt 12 expand radially into the threads 80 of the housing 74. The radial expansion of the threads 16 of the lock bolt 12 into the threads 80 of the housing 74 generates further frictional loading between the threads 80 of the housing 74 and the threads 16 of the lock bolt 12 and thus provides further locking redundancy and a greater factor of safety with respect to a reusable threaded fastener.

The locking fastener 10 can join together at least two components by a threaded coupling and prevent unintentional disengagement through a multiple redundant locking system. The locking fastener 10 is installed by first threading the lock stud 14 into the threaded aperture 80 of the housing 74. The head 34 of the lock stud 14 may protrude out of the housing in some configurations or alternatively may reside entirely within the housing in other configurations. Next, a component such as the lobed ring 72 can be placed adjacent the housing 74 and around the shank 38 of the lock stud 14 if the lock stud is protruding out of the housing. The lock bolt 12 is then guided over the shank 38 of the lock stud 14 and torqued to a predetermined level so that a component such as the lobed ring 72 is clamped between the housing 74 and the bolt head 20. The lock stud 14 must be inserted far enough into the threaded aperture 80 of the housing 74 to ensure that the tapered wall 52 of the bolt 12 does not engage the tapered wall 42 of the lock stud 14 when torquing the bolt 12 into the housing 74. After the lock bolt 12 is torqued appropriately, the lock stud 14 is torqued and locked into place by a moving the lock stud 14 back toward opening of the threaded aperture 80 in the direction of arrow B in FIG. 4. e.g. if the threads are normal right hand threads the lock stud 14 would be torqued by rotating the lock stud 14 in a counterclockwise direction. In this manner, the faster 10 is locked with at least four redundant locking features.

The lock bolt 12 and the lock stud 14 can be formed from similar materials or, if desired completely different materials. If a desired material for the fastener 10 is susceptible to galling for example at the interface of the tapered walls 42, 52, it would be advantageous use dissimilar materials for the hollow lock bolt 12 and the lock stud 14. Furthermore, it may be desirable to apply one or more coatings on portions of the lock bolt 12 and lock stud 14. The coatings in combination with the base material can be used for anti-fretting, friction reduction, friction enhancement, anti corrosion, thermal conduction, thermal insulation, electrical conduction, and/or electrical insulation depending on the properties desired. Typical base material selection for the fastener 10 may include but is not limited to: plastics, metals, ceramics, composites, and combinations thereof.

Smooth for purposes of this application means that the surfaces of the tapered walls of the lock bolt and lock stud are generally flat and free from projections or unevenness such that the two concentric arcuate walls can slidingly engage one another without restriction due to the surface geometry or surface finish prior to forming a desired taper lock. The taper lock being caused by a press fit or friction lock that occurs between the two surfaces of the tapered walls when the lock is torqued to a desired level relative to the lock bolt.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A locking fastener comprising: a hollow lock bolt having a drive head formed proximate a first end and external threads formed proximate a second end, the hollow lock bolt further having a relatively smooth internal wall with an angled taper extending along at least a portion thereof; and
   a lock stud constructed to engage the hollow lock bolt, the lock stud having a drive head proximate a first end and external threads formed proximate a second end, the lock stud further having a relatively smooth external wall with an angled taper formed along a portion thereof,
   wherein the locking fastener is configured for clamping a first component between at least a portion of the hollow lock bolt and a second component; and
   wherein the lock stud and hollow lock bolt are configured so that the drive head of the lock stud extends past an interface between the first component and the second component in an installed condition of the locking fastener; and
   wherein the taper angle of the hollow lock bolt and the lock stud are different from one another.

2. A method of fastening comprising:
   engaging a threaded lock stud with a threaded aperture of a housing by rotating the lock stud in a first direction wherein the rotating of the lock stud is terminated before a drive head of the threaded lock stud completely enters the threaded aperture;
   sliding a threaded hollow lock bolt over the lock stud;
   threadingly engaging the hollow lock bolt with the threaded aperture of the housing;
   torquing the hollow lock bolt to a predetermined level without engaging the lock stud; and
   torquing the lock stud to a predetermined level by rotating the lock stud in a second direction opposite the first direction and engaging a tapered wall of the lock stud with a tapered wall of the hollow lock bolt.

3. The method of claim 2 further comprising:
   clamping a component between the hollow lock bolt and the housing.

4. A locking fastener comprising:
   a hollow lock bolt having a drive head disposed proximate a first end and external threads disposed proximate a second end, the hollow lock bolt further having a an internal wall with a taper of approximately 4 degrees extending along at least a portion thereof; and
   a lock stud having a drive head disposed proximate a first end and external threads disposed proximate a second end, the lock stud further having a external wall with a taper of approximately 4 degrees extending along a portion thereof, wherein the drive head of the lock stud is configured to enter completely into the hollow lock bolt,
   wherein the locking fastener is configured for clamping a first component between at least a portion of the hollow lock bolt and a second component when the threads of the hollow lock bolt and the threads of the lock stud engage corresponding mating threads in the second component.

* * * * *